United States Patent
March et al.

(10) Patent No.: US 8,915,830 B2
(45) Date of Patent: Dec. 23, 2014

(54) QUICK CHANGE CONVEYOR ROLL SLEEVE ASSEMBLY AND METHOD

(75) Inventors: Timothy D. March, Carlisle, PA (US); John A. Pokrzyk, Jr., Boiling Springs, PA (US); Daryll A. Hasco, Newville, PA (US); Mark Bright, Sewickley, PA (US)

(73) Assignee: Pyrotek, Inc., Solon, OH (US)

( * ) Notice: Subject to any disclaimer, the term of this patent is extended or adjusted under 35 U.S.C. 154(b) by 531 days.

(21) Appl. No.: 13/259,287

(22) PCT Filed: Mar. 24, 2010

(86) PCT No.: PCT/US2010/028425
§ 371 (c)(1),
(2), (4) Date: Dec. 8, 2011

(87) PCT Pub. No.: WO2010/111341
PCT Pub. Date: Sep. 30, 2010

(65) Prior Publication Data
US 2012/0073103 A1 Mar. 29, 2012

Related U.S. Application Data

(60) Provisional application No. 61/210,911, filed on Mar. 24, 2009.

(51) Int. Cl.
| | |
|---|---|
| *B25F 5/02* | (2006.01) |
| *B65G 39/07* | (2006.01) |
| *C03B 35/18* | (2006.01) |
| *C23C 2/00* | (2006.01) |
| *F27D 3/02* | (2006.01) |
| *C25D 7/06* | (2006.01) |
| *C25D 17/00* | (2006.01) |

(52) U.S. Cl.
CPC .............. *B65G 39/07* (2013.01); *C03B 35/181* (2013.01); *C03B 35/183* (2013.01); *C03B 35/186* (2013.01); *C23C 2/003* (2013.01); *F27D 3/026* (2013.01); *C25D 7/0664* (2013.01); *C25D 17/00* (2013.01)
USPC ................... 492/45; 29/895.21; 29/895.213; 492/40; 492/47

(58) Field of Classification Search
USPC ......... 29/895, 895.1, 895.2, 895.21, 895.211, 29/895.213, 895.22, 895.33; 492/38, 39, 492/40, 45, 49, 53, 54, 47
See application file for complete search history.

(56) References Cited

U.S. PATENT DOCUMENTS

| | | | |
|---|---|---|---|
| 1,930,999 A | 10/1933 | Gaskell | |
| 1,996,500 A * | 4/1935 | Adams, Jr. | ........................ 492/1 |

(Continued)

OTHER PUBLICATIONS

International Search Report and Written Opinion for PCT/US2010/028425 May 13, 2010.

*Primary Examiner* — Ryan J Walters
(74) *Attorney, Agent, or Firm* — Fay Sharpe LLP (57) ABSTRACT

A quick change conveyor roll assembly for metal or glass processing comprising an inner roll shaft having a rigid and elongated cylindrical surface supported and rotationally driven by an associate rotor mean. At least one removable spool having a cylindrical body with a first diameter, a hollow interior therethrough and a collar rigidly adapted at a first end, the collar having a second diameter whereby the second diameter is greater than the first diameter. At least one removable and replaceable insulated roll sleeve being slidably mounted over at least a portion of said removable spool and abutting said collar, the insulated roll sleeve including at least one layer of an insulation material and a securing means operably adjustable to hold said roll sleeve about said removable spool at a second end in a predetermined location on said inner roll shaft.

17 Claims, 9 Drawing Sheets

(56) References Cited

U.S. PATENT DOCUMENTS

| | | |
|---|---|---|
| 3,802,495 A | 4/1974 | Hordis |
| 4,352,230 A | 10/1982 | Sukenik |
| 6,004,507 A | 12/1999 | Morando |
| 6,168,757 B1 | 1/2001 | Morando |
| 6,562,293 B1 | 5/2003 | Morando |
| 6,716,147 B1 | 4/2004 | Hinkle et al. |
| 6,899,773 B2 | 5/2005 | Buck |

* cited by examiner

FIG. 22

QUICK CHANGE CONVEYOR ROLL SLEEVE ASSEMBLY AND METHOD

This application claims priority to U.S. Provisional Application No. 61/210,911, filed Mar. 24, 2009.

BACKGROUND

The present invention relates to a device and method of providing a quick change roll sleeve. It finds particular application in conjunction with conveyors in various high temperature applications such as galvanizing baths as well as steel and glass processing applications, and will be described with particular reference thereto. However, it is to be appreciated that the present exemplary embodiment is also amenable to other like applications.

Rolls are used as conveyors in various high temperature applications, such as galvanizing baths as well as steel and glass processing. In such environments, the surface of such rolls are corroded and degraded by the harsh conditions in which they operate. Thus, the surfaces of such rolls need to undergo maintenance or be replaced on a regular basis, which can lead to down time and reduced productivity.

Rolls such as those employed as roller conveyors for use in high temperature glass processing applications can be made from an inner metal or ceramic shaft that has an outer high temperature insulation cover. In manufacturing the roll, the insulating cover can be supplied as annular discs, or "washers", which are assembled on the shaft and pressed together, as discussed, for example, in U.S. Pat. No. 3,802,495 (the disclosure of which is herein incorporated by reference). These discs are pressed together between end walls by a compressive force. Because the binding agent used in the insulating cover tends to be destroyed at high temperature, it is important to maintain the discs under the axial pressure between the end walls.

A conveyor roll can also be made by sliding a plurality of compressed high temperature millboard annular discs onto a shaft, i.e., annular discs of an organic and inorganic binder materials reinforced with fiber materials. These millboard discs can be compressed axially on the shaft. The surface of the roll can be heated to produce a non-marking abrasion resistant covering on the roll on which the glass is conveyed.

Likewise, sink rolls and stabilizer rolls used in molten zinc and zinc/aluminum galvanizing baths must be replaced or serviced often due to dross buildup, oxidation and corrosion of the roll surface.

There is a need in the industry for an improved method of servicing such rolls without the need to return the entire roll to the manufacturer or service agent and incur the corresponding extended downtime entailed by this.

BRIEF DESCRIPTION

In one embodiment, there is provided a glass conveyor roll sleeve assembly including a steel or ceramic roll shaft, a removable spool, and a removable and replaceable insulated roll sleeve. More particularly, the conveyor roll assembly comprises an inner roll shaft having an elongated cylindrical surface. At least one spool having a cylindrical body including a first diameter and a cylindrical interior passage is provided, the interior passage is sized to fit over the inner roll shaft. The spool further includes a collar at a first end. The collar engages at least one removable and replaceable insulated roll sleeve slidably mounted over at least a portion of the spool. The insulated roll sleeve includes at least one layer of an insulation material. A releasable securing means is provided at a second end retaining the spool on the inner roll shaft.

In a second embodiment, there is provided a roll assembly for use in metal processing including a roll shaft, a removable spool, and a removable metal alloy roll sleeve.

Other aspects of the invention are directed to the methods of making the above roll assemblies and the insulated roll sleeve. Still further invention aspects are directed to novel roll coverings for use in the above roll assemblies.

DETAILED DESCRIPTION

The present embodiments are directed to the use of removable tubes or sleeves on rolls used in harsh environments that can be slipped over a roll body or inner shaft. Depending on the application, these sleeves can be made from a variety of materials as suited. These sleeves assist in ease of roller maintenance, as fresh sleeves can be readily slipped onto the roll body during equipment down time after removal of the spent insulated roll sleeve instead of servicing the entire roll assembly.

Figure 1:
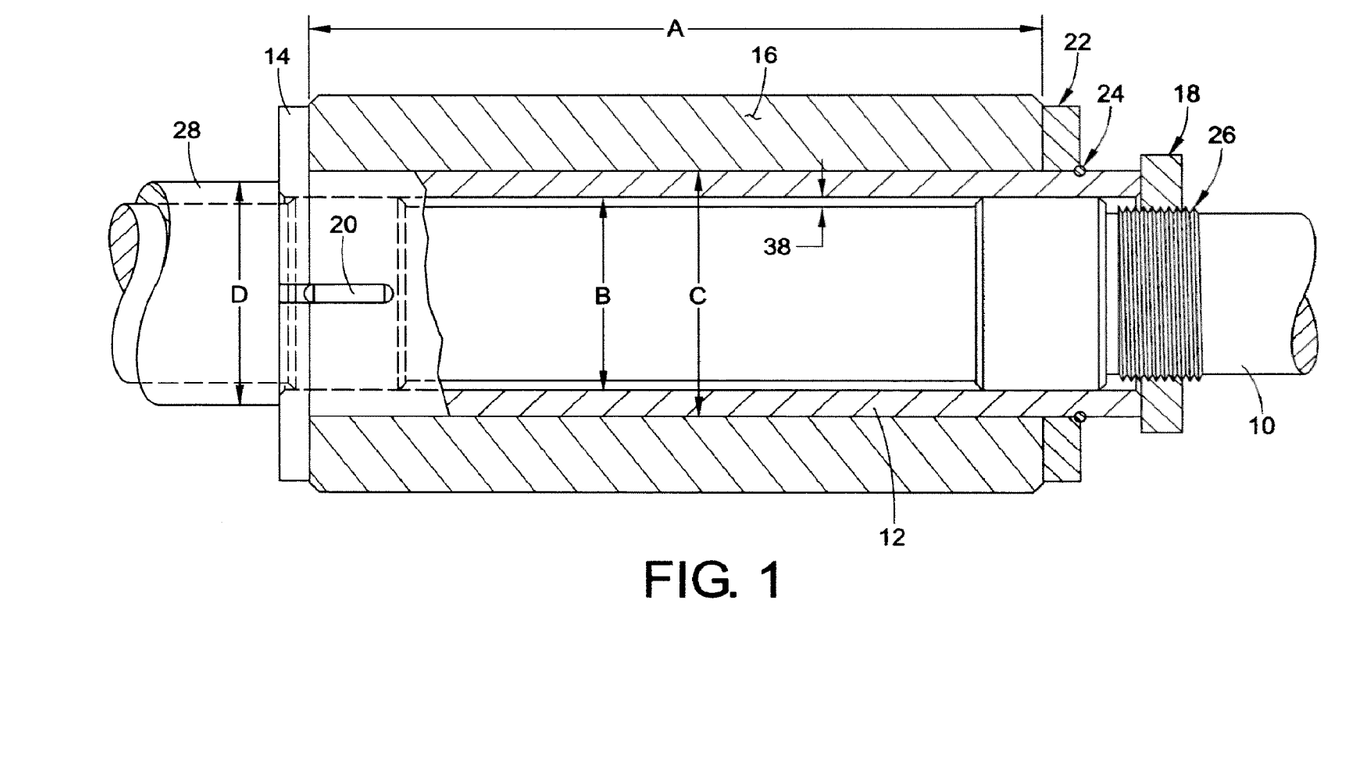
FIG. 1 is a side view of a roll assembly including the roll body, a removable spool and roll sleeve on the removable spool.

Therefore, with reference to FIG. 1, in one embodiment, there is provided a roll assembly including a roll shaft or body 10, a removable spool 12 including a collar 14 slidably mounted over the roll shaft, and a roll sleeve 16 mounted on the spool 12. A locking nut 18 threaded onto threads 26 on the roll shaft 10 or other securing component may be used to hold the spool 12 and roll sleeve 16 covering the spool in place on the roll shaft 10. The roll shaft 10 may have a larger diameter roll body end 28, against which the spool abuts. The roll shaft may be supported and rotationally driven by a rotation mechanism or other conventional means.

A keyway 20 may be provided with a key that extends from the roll shaft 10 through the spool 12 and roll sleeve 16 to grip and keep the spool 12 and roll sleeve 16 aligned with the roll shaft 10 while it rotates. When deployed, one end of the roll sleeve 16 will abut against the collar 14 of the spool 12 while the other end may have a locking collar 22 that snaps into a recess 40 (see in FIG. 3) on the spool via at least one snap ring 24 or other means.

The dimensions for the above components will vary based on the application for which the roll assembly is used. However, in one embodiment, the length of the roll sleeve A, may be about 14.25 inches. The inner diameter B of the spool may be 2.5 inches, while the outer diameter C may be 3.0 inches, giving a thickness of 0.25 inches for the spool. The roll body end of the roll shaft may have a diameter of 3.0 inches.

Figure 2:
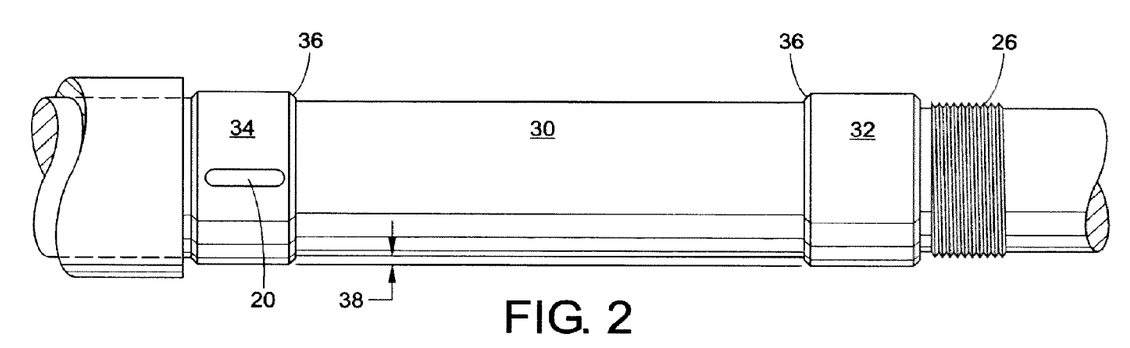
FIG. 2 is a side view of a roll shaft.

With reference now to FIG. 2, the roll shaft may have a central area 30 of reduced diameter between two distal portions 32 and 34. A chamfer region 36 located on a leading edge of the distal portions. When the spool 12 is placed over the roll shaft 10, this creates a relief area 38 between the spool and the central area 30.

Figure 3:
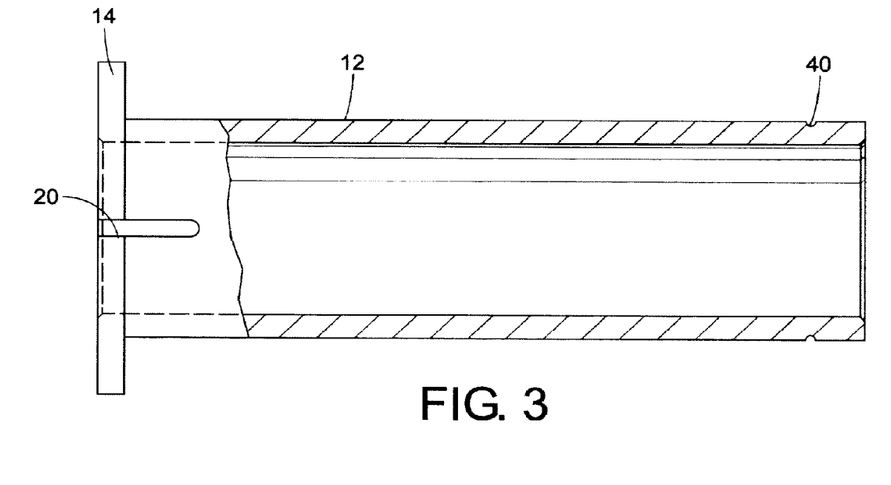
FIG. 3 is a side view of a removable spool.

With reference now to FIG. 3, shown is the removable spool 12 including collar portions 14 and keyway 20. Also seen is a recess 40, as discussed above, providing a point of attachment for a locking collar and snap rings 24 or other attachment means on the roll sleeve.

Figure 4:
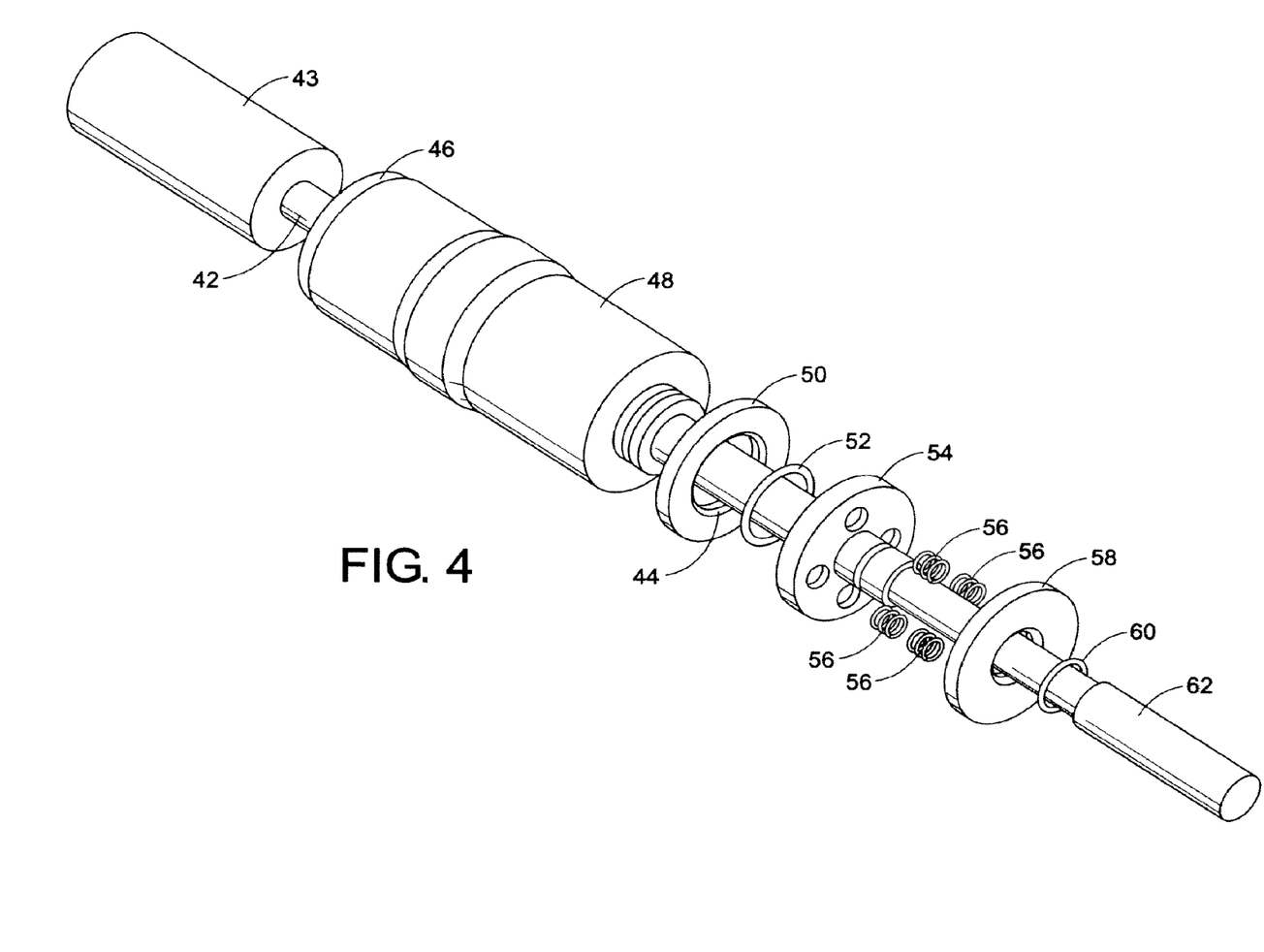
FIG. 4 is an exploded view of one embodiment of a quick change conveyor assembly.

With reference now to FIG. 4, an exploded view of one embodiment of the assembled spool is depicted. As shown, stainless steel core shaft 42 supports dense fused silica roll body 43, stainless steel press sleeve 44 and stainless steel spool 46. Roll covering 48 is disposed on stainless steel spool 46 and retained by locking collar 50, which itself is retained by snap rings 52. The combination of pressure plate 54, springs 56, locking collar 58 and snap rings 60 operate to provide pressure retention on the stainless steel spool 46. Finally, bearing sleeve 62 provides a bearing surface about the shaft 42 during rotation of the roller body. The roll covering 48 is shown with an optional raised portion 49, however this embodiment does not limit this disclosure to cover other geometric orientations of the roll covering 48 or roll sleeve 16.

Figure 5:
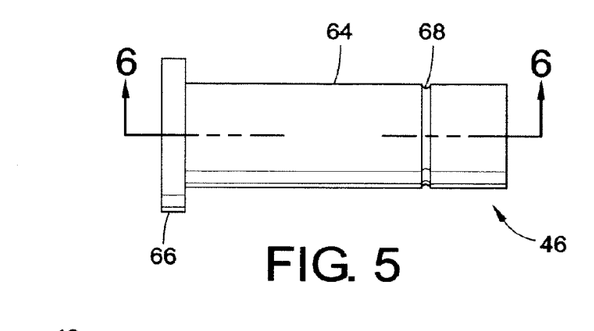
FIG. 5 is a side view of a removable spool.

With reference to FIG. 5, the removable spool 46 preferably comprises a machined steel or stainless steel tube 64 with a solid end ring 66 or collar on a first end and a removable locking ring with a snap lock recess 68 and snap rings (or some other securing device) on the other end, and covered with a high temperature insulation material between the rings.

Figure 6:
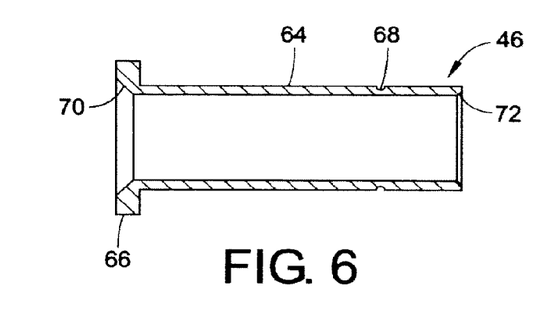
FIG. 6 is a cross-sectional view of a removable spool.

FIG. 6 additionally indicates a chamfered or angled inner edge 70, 72 at both the first end adjacent the end ring 66 and at a second end opposite the first end. The angled inner edges 70, 72 enable stable retention of the spool by interaction with adjacent elements axially aligned with the spool 46 about the shaft 42.

Figures 7, 8:
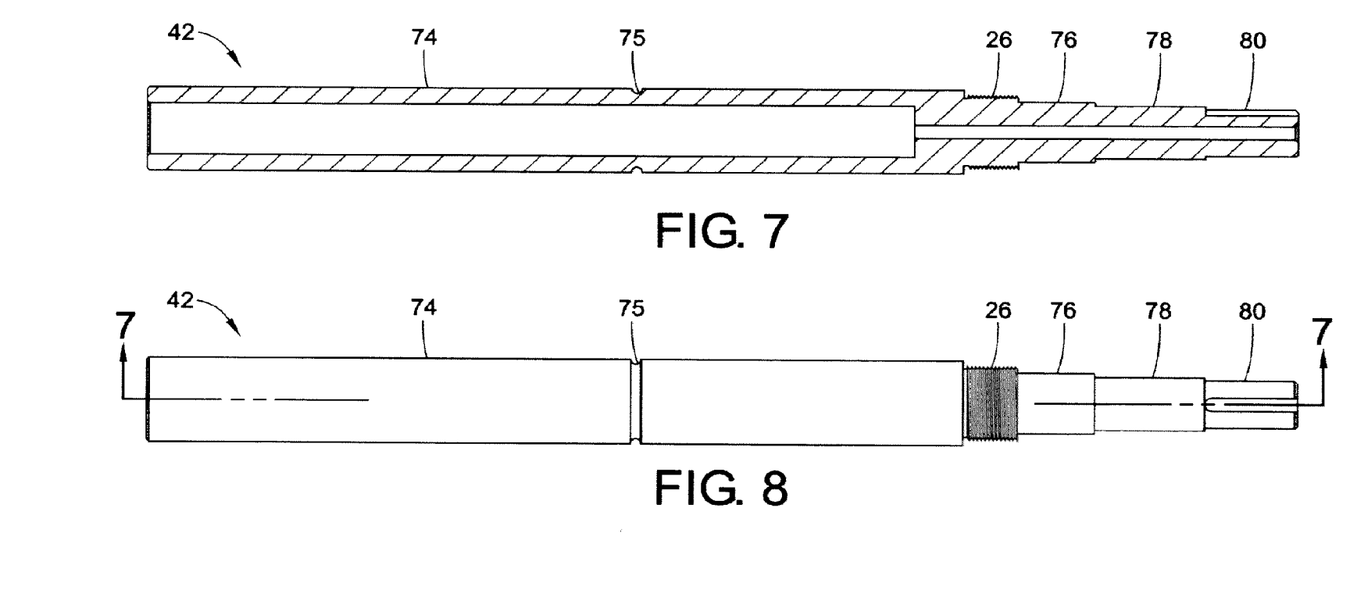
FIG. 7 is a cross sectional view of a inner roll shaft.
FIG. 8 is a side view of an inner roll shaft.

The roll shaft 42 typically comprises a steel or stainless steel alloy solid shaft with or without a ceramic I.D.×O.D. tube designed to span the width of the glass, steel or zinc plated ribbon while supporting the roll sleeve. The roll shaft 42 as shown in FIGS. 7 and 8 depict an elongated cylindrical body 74 that comprises at least a portion of a retaining end with various sections 76, 78, 80 comprising at least a portion of a receiving end located along the body each having different diameters and being concentrically and axially aligned with the other. Threads 26 and recess 75 are also shown and may be located along the elongated body.

Figure 9:
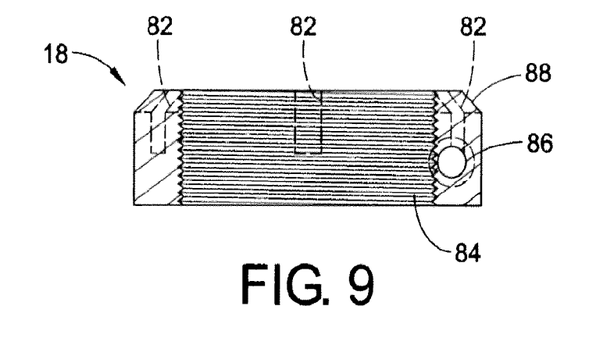
FIG. 9 is a cross-sectional view of a locking nut.
Figure 10:
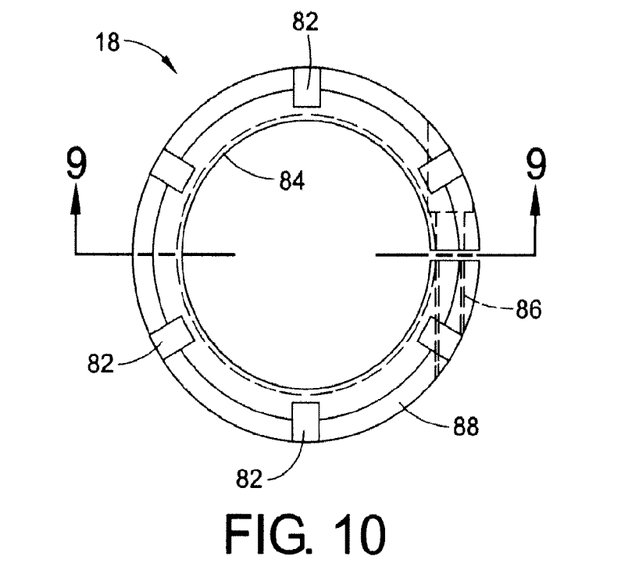
FIG. 10 is a top view of a locking nut.
Figure 11:
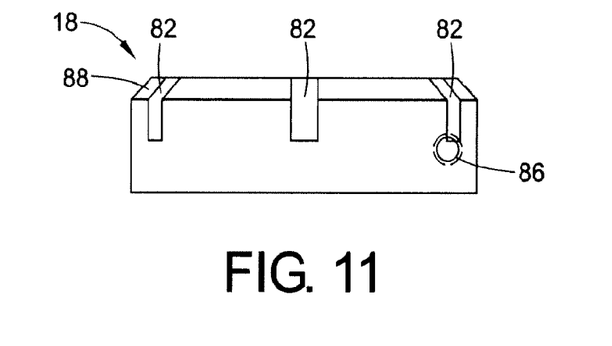
FIG. 11 is a side view of a locking nut.

FIGS. 9, 10 and 11 depict one embodiment of the securing means. The locking nut 18 is cooperative with the threads 26 about the shaft and is operably adjustable to hold the removable spool 12 in a predetermined location about the roll shaft 10. In this embodiment, the locking nut 18 is provided with a plurality of slots 82 equally spaced about the top portion of the locking nut 18. The locking nut is provided with a threaded inner surface 84 to operably interact with the threaded 26 section of the shaft 10. The locking nut 18 is provided with an adjustment member 86 for manual tightening/loosening of the assembly. The adjustment member 86 aligns transversely with the threads 26 of the shaft 10. Also provided is a chamfered or angled top edge 88.

FIGS. 12 through 15 depict a retaining ring 90 which can be optionally provided as part of a preferred embodiment of the assembly. The retaining ring 90 has a washer type construction is substantially flat and cylindrical with a hollow interior with a concentric diameter having a measurement relative to the predetermined section of the shaft 10. Holes 92 are optionally provided at equally spaced intervals about the retaining ring 90 and are in transverse alignment with the longitudinal axis of the shaft 10. A chamfered or angled portion 94 is located about at least one side of the inner surface of the retaining ring 90. The chamfered portion 94 is concentrically aligned about the retaining ring 90 and allows other elements to engage the ring and maintain a firm and compressed axial alignment about the shaft while in operation. Specifically, the retaining ring 90 abuts to a snap ring provided about the recess 40 of the spool 12 to allow for a compressed fit between the spool 12 and roll sleeve 16 during operation.

Figure 16:
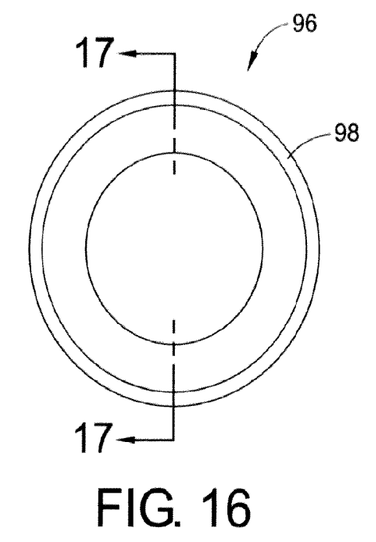
FIG. 16 is a top view of a spacer tube.
Figure 17:
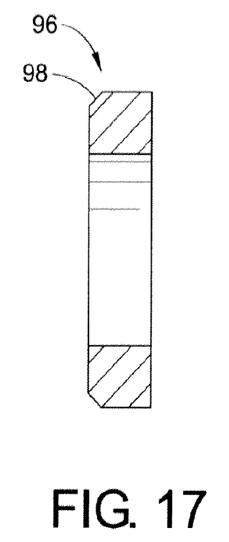
FIG. 17 is a cross-sectional view of a spacer tube

FIGS. 16 and 17 depict a spacer tube 96 that engages both the locking nut 18 and the spool 12 in the preferred embodiment. The spacer tube is cylindrical with a generally washer type structure with a chamfered or angled edge 98 about the exterior portion of the spacer tube 96 to operatively engage the chamfered or angled inner edge 72 of the spool 12 while axially aligned about the shaft 10.

Figure 18:
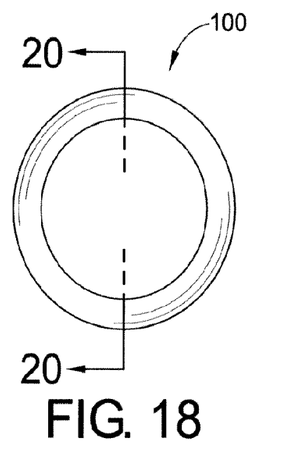
FIG. 18 is a top view of a centering collar.
Figure 19:
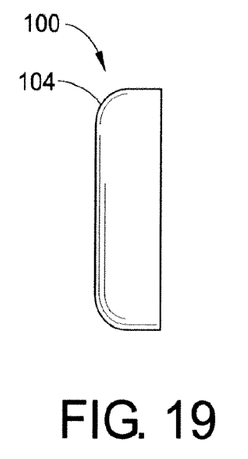
FIG. 19 is a side view of a centering collar.
Figure 20:
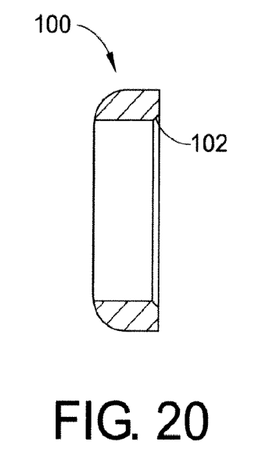
FIG. 20 is a cross-sectional view of a centering collar

FIGS. 18 through 20 show the a centering collar 100 which may be used in place of the larger diameter roll body end 28 to engage the spool 12 thereby maintaining the location of the spool about a predetermined area about the shaft 10. This embodiment has a groove edge 102 opposite the chamfered or angled edge 104 that engages the spool. The grooved edge 102 is formed to engage a snap ring that is provided relative to the recess 75 about the shaft 10.

Figure 21:
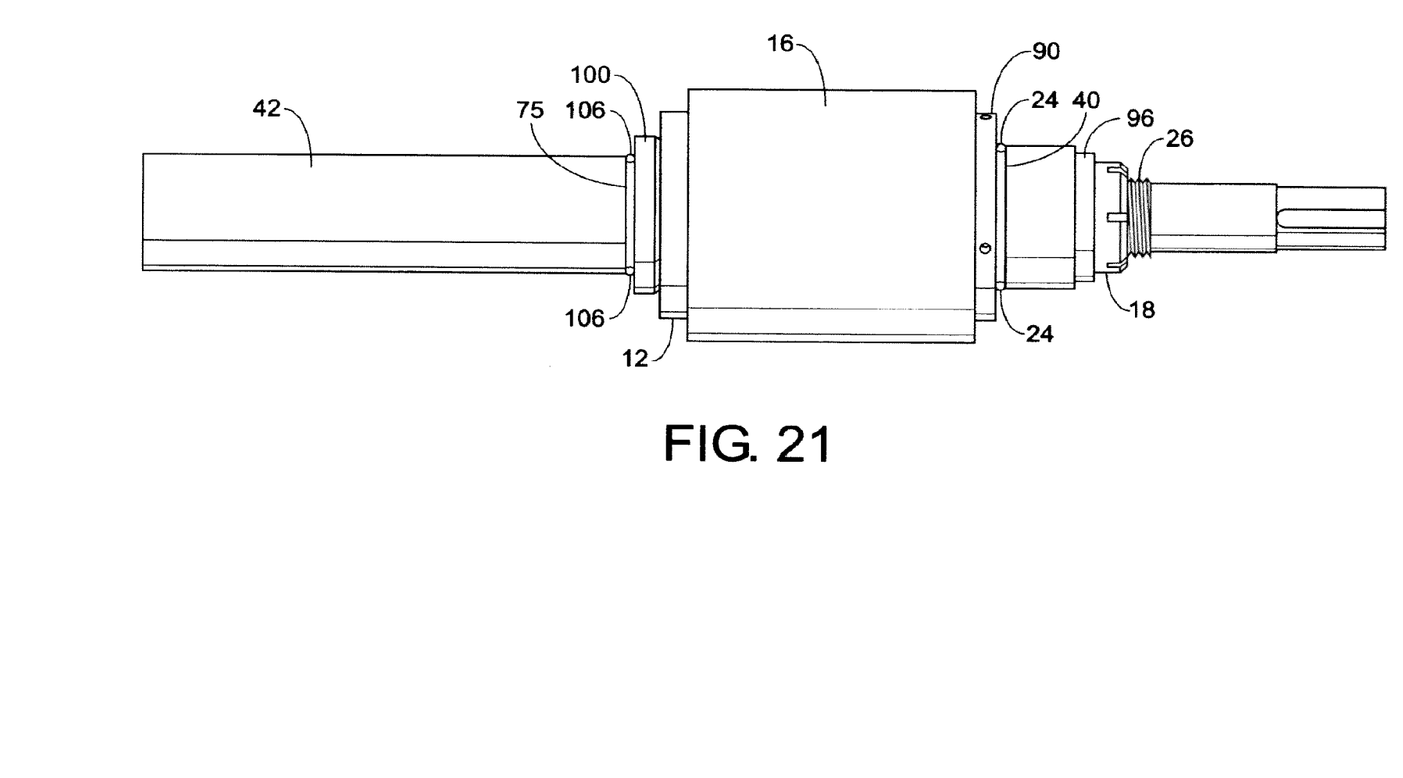
FIG. 21 is a side view of one embodiment of a quick change conveyor roll assembly.

Shown in FIG. 21, a preferred embodiment indicating the relative locations of each element about the shaft 42 in a retained position. The centering collar 100 is located about the shaft 42 at a predetermined location relative to the snap rings 106 and recess 75. The spool 12 and roll sleeve 16 abut the centering collar 100. The retaining ring 90 acts to lock the roll sleeve 16 onto the spool 12 with snap rings 24 and recess 40. The spacer tube abuts both the spool 12 and the locking ring 18.

Figure 22:
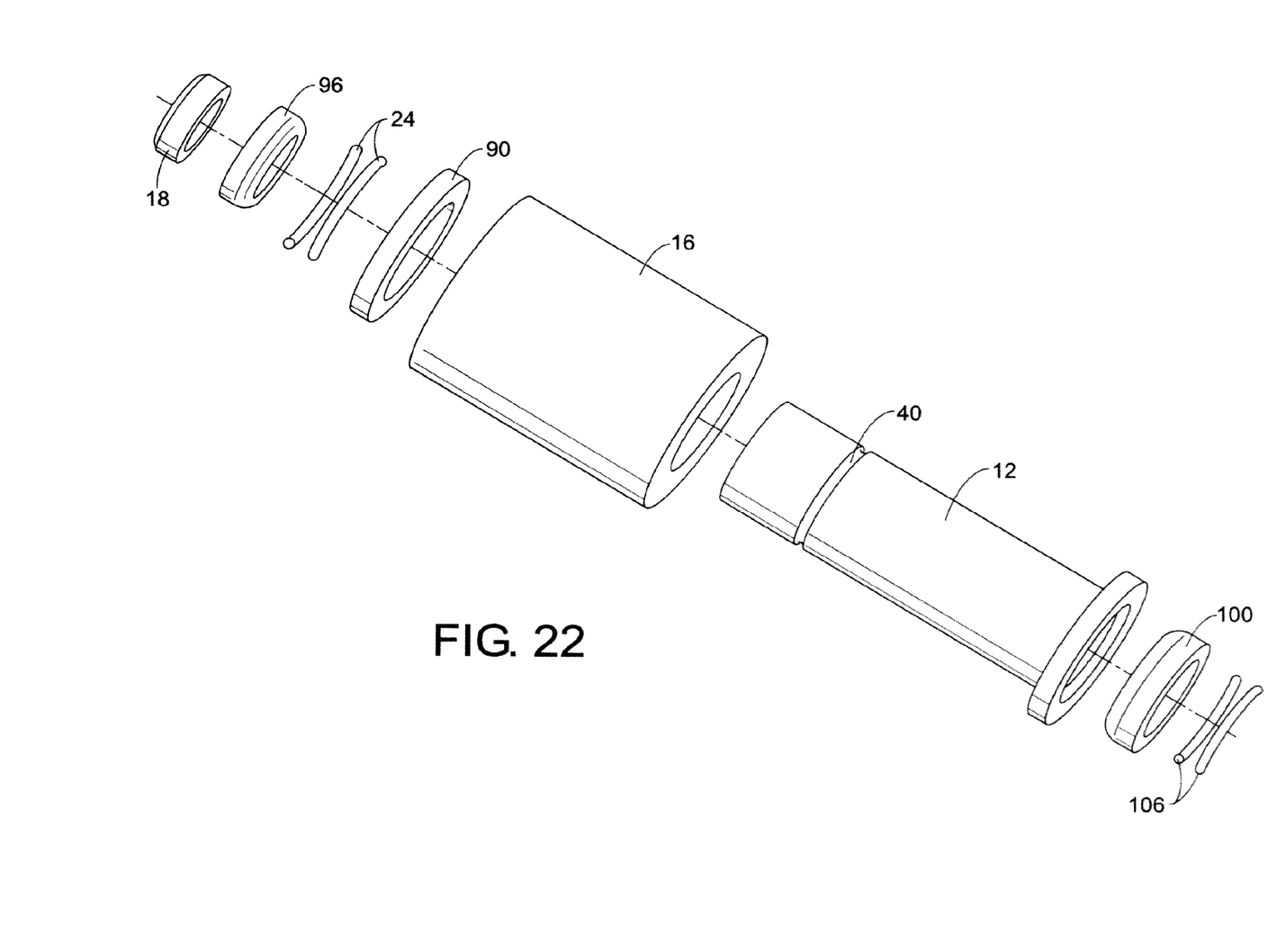
FIG. 22 is an exploded isometric view of one embodiment of a quick change conveyor roll assembly.

With reference to FIG. 22, the roll sleeve assembly in a preferred embodiment is shown in an exploded diagram. Here, snap rings 24, 106 are provided for the stability of other elements about the removable spool 12 and core shaft 42 respectfully. Snap rings 106 are shaped to adapt to recess 75 about the core shaft 42 and axially abuts centering collar 100. The collar 14 of the removable spool 12 axially abuts centering collar 100 which is aligned within the angled inner edge 70 of the spool. Roll sleeve 16 is placed about the spool 12 and abuts the collar 14 on a side opposite the centering collar 100. Retaining ring 90 is placed about the spool 12 and axially abuts the roll sleeve 16 at a predetermined distance relative to the location of the recess 40 on the spool 12.

Snap rings 24 are shaped to adapt to recess 40 and axially abut retaining ring 90 at the chamfered or angled portion 94. Spacer tube 96 fits about the core shaft 42 over the threads 26 and axially abuts the spool 12. The chamfered or angled edge 98 of the spacer tube 96 adapts to the angled inner edge 72 of the spool to axially align the spool 12 about the shaft and provide mechanical spacing between the locking nut 18 and the spool 12. The locking nut 18 is threaded onto threads 26 and compresses the spacer tube 96 and spool 12 to the centering collar 100 position on the shaft 42 stabilized by snap rings 106. It is noted that this construction allows the roll sleeve 16 to be removed and replace about the assembly without having to loosen the locking nut 18 and remove the spacer tube 96 or spool 12.

The composition of the roll sleeve 16 or roll cover 48 will vary greatly based on the final application for which the roll assembly is designed. The design and composition of the roll sleeve will be discussed for several applications. However, it should be noted that the concept described herein can be applied to other applications as well.

Thus, with regard to a conveyor roll assembly for use in glass processing, such rolls for transferring the hot glass ribbon are disposed between the outlet of the glass melting furnace and the cold end of the process where the glass is cut and packaged. These rolls are brought into contact with the lower surface of the glass ribbon and are used to support and transfer the hot glass. For such conveyor rolls, the roll sleeve 16 or roll covering 48 will typically be an insulated roll sleeve comprising an insulating layer of a highly compressed fiberboard, millboard or precast ceramic cylinders made from similar fibrous materials. The fiber is preferably an alumina fiber board or millboard material.

The roll sleeve 16 generally comprises a refractory covering or similar type surface. It is often advantageous that the fiber be binder-free. Compressed, binder-containing fiber may be useful, and will be discussed further on hereinbelow. By "at least substantially ceramic fiber" it is meant that the fiber will be a major amount, i.e., greater than 50 weight percent, of ceramic fiber. The minor amount, i.e., under 50 weight percent, balance can be other synthetic or natural mineral fiber, e.g., glass fiber or mineral wool, including mineral wool with additives. Advantageously, for best roller performance without degradation under high heat application, the fiber will be at least about 80 weight percent ceramic fiber and preferably for best overall performance characteristics, will be all ceramic fiber.

Although it is contemplated that such ceramic fiber may not be a silica-containing fiber, as represented by alumina fiber or fiber of boron compound material, e.g., fibers of boron oxide, boron carbide and boron nitride, it is preferred for economy that the ceramic fiber be a silica-containing fiber. The silica-containing fiber may simply be silica fiber, although usually the silica is present with one or more of alumina, zirconia, chromia, or titania. Such silica-containing fibers are also meant to include fibers from silicon nitride, silicon carbide, calcium-aluminum silicate and the like. Advantageous fibers which have desirable inertness, i.e., non-reactivity with the working environment as well as with articles being conveyed over the roller, combined with a desirable insulating property can be prepared from silica and alumina. Improved high-temperature properties for ceramic fiber can be achieved when the silica and alumina are combined with zirconia or titania.

Typically, with commercially available fibers prepared from silica and alumina, the alumina content can vary in an amount of from about 45 to about 80 weight percent alumina with an about 20 to 55 weight percent balance of silica. Where additional substituents are utilized, e.g., zirconia, the constituent ranges can be further varied. Thus where zirconia may be present, it might contribute as little as about 3 weight percent. There can then be present, as taught in U.S. Pat. Nos. 4,558,015 and 4,555,492, silica in an amount from about 45 up to 75 weight percent or more, and alumina in an amount of as little as about 10 weight percent, up to nearly 40 weight percent. Moreover, the amount of zirconia in some formulations may exceed 20 weight percent. It will be understood that the fiber may be prepared by any process useful for preparing ceramic fiber. Commercially, such processes include those which fiberize a molten stream, e.g., blowing of a molten stream to fiberize the molten material, or causing the molten stream to impact rapidly spinning wheels which fiberizes the melt.

As the fibers are produced, it will be typical that they will be initially accumulated together into a mat form. Such may be accomplished as by collecting random fibers on a continuous chain-mesh belt apparatus. The accumulated fibers that typically are collected on the mesh belt apparatus can then be needled or stitched together. For purposes of the present invention, these fibers in mat form, or when consolidated as by needling into blankets, can also be compressed, with or without the application of heat. Typically in accumulated form, the initial mats will have a density on the order of from about 2 to about 4 pounds per cubic foot, and after consolidating the fiber, the accumulated fibers as blankets will have a density on the order of from about 4 to 10 pounds per cubic foot for ceramic fiber. Any precompression in accumulating the fibers, as by heating or rolling, will still typically provide a blanket having a density of not above about 10 pounds per cubic foot.

The mats or blankets, the fiber in which may also be generally referred to herein as "bulk" fiber, can be stamped or cut into disc shape. Bundles of these discs, especially when stamped from a thin blanket, may then be precompressed into multiple-disc "sections" sometimes also referred to herein as "donuts". Typically, the initial blankets can have thickness from on the order of ¼ to ½ inch, up to as thick as 6 inches. For the thinner ceramic fiber blankets which are usually ¼ inch up to about 1 inch thick, discs can be compressed into typically 1 inch to 4 inch thick sections. The thicker blanket discs may not be precompressed into sections. Upon compression into sections, which compression can be in an amount, as more particularly discussed hereinbelow, from about 50 percent to about 80 percent, the fiber may be compressed to a density that might vary, in broadest consideration and basis dry fiber, within the range of from about 16 to about 50 pounds per cubic foot.

For such commercial ceramic fiber prepared from silica and alumina, a greater than 20 pounds per cubic foot density, e.g., an about 22 to 40 pound per cubic foot range of density, is highly advantageous for best fiber insulating characteristic. It is to be understood that compression may be of wet or dry fiber, but unless otherwise specified, compressed fiber densities are to be understood to be for dry fiber.

For many applications it is most advantageous to utilize a bulk fiber since the individual fibers in the bulk fiber are of varying lengths. Such fibers of varying lengths enhance the ability of the fibers to intertwine and hold together under compression. For these applications using fibers of varying lengths, it is further desirable that all fibers have a length of at least about 0.5 inch, with long fibers usually having length within the range of from about 8 inches up to a length of about 10 inches. Usually only a very few fibers will be longer than about 10 inches, as such fibers can be difficult to work with, while fibers shorter than about 0.5 inch may be of insufficient length to effectively intertwine for these fibers of varying lengths. A particularly preferred fiber mixture for fibers of varying lengths has some individual short fibers at least about 2 to 4 inches long, in mixture with long fibers, i.e., longer than 4 inches and with lengths up to about 8 to 10 inches, often with fibers of at least about 6 to 8 inches in length.

It is however to be understood that in some applications it can be useful to employ milled fiber or chopped fiber, or both. Chopped fiber i.e., bulk fiber which has been chopped, can have individual fibers generally from 0.25 inch to one inch in length. Milled fiber, typically fiber that has been chopped and subsequently ball-milled, can be of extremely short, and more uniform length. Fiber lengths for milled fiber can be on the order of 10 to 30 microns. Although mixtures are contemplated for milled fiber with other fibers, e. g., one or more of chopped fibers or the above described fibers of varying lengths, it is to be understood that the milled fiber may be utilized by itself, such as in a hardcoat formulation, as will be described in detail hereinafter. Also, since milled fiber is not as subject to fiber crushing as are individual longer length fibers, the utilization of milled fiber can be particularly serviceable at elevated compression.

It has not been industrial convention to substantially compress ceramic fiber owing to a concern for crushing the fiber. It has however now been found that discs of the fiber on a shaft can be highly axially compressed. Such compression for ceramic fiber should be in an amount from above about 50 percent up to most always about 80 percent, although slightly greater compression, i.e., 83 to 85 percent might be achieved. A compression of less than about 50 percent will not provide for a desirable dense fiber having the requisite resistance to compression at the roll surface as required in the industry. On the other hand, most always a compression of greater than about 80 percent may lead to fiber crushing. Advantageously for desirable roll strength and resistance to surface compression, the ceramic fiber will be compressed in an amount above about 55 percent, or more often above about 60 percent and preferably within a range of from about 65 to about 75 percent.

For some applications it may be desirable to use a binder in the compressed fiber roll cover. Such may be a "fugitive binder", that is, a binder that will be readily susceptible to volatilization from the cover during drying of the cover or at elevated temperature use. Such fugitive binder may readily penetrate into the compressed fiber roll. It may also be referred to herein as an "organic binder", and representative such binders include starch, latex materials and cellulosic substituents, e.g., an aqueous suspension of cellulose methyl ether. The word "binder" may also refer to a substance which will not readily penetrate into the compressed fiber roll, such as by wicking, in appreciable amount. These binders, sometimes referred to herein as "inorganic binders", in general may be used with the fiber prior to or after compression. Representative inorganic binders include cements, calcium aluminate and clays. Thus, the inorganic binders are materials which will be present, at least as a residue in substantial amount, in the compressed fiber roll cover during use of the roll cover.

A rigidizer may be used in an amount to provide from about 5 weight percent up to about 70 weight percent or more, and preferably about 15 to 60 weight percent, of rigidizer residue after drying of the roll, in the total weight of the roll. After use, the resulting impregnated cover should be dried. Drying, as such term will generally be used herein, may be accomplished at quite elevated temperature, e.g., 500° C., but also such for economy will advantageously be at a more modest temperature such as from about 300° C. down to about 100° C. or below. After application of rigidizer, drying is preferably at such more modest temperature, e.g., about 200° C., for a time of up to about 24 hours, but more usually from about 8 hours to about 12 hours. Thereafter, the fiber cover may be further conditioned in a manner such as described hereinbelow. For example, the cover can be heat treated at an elevated temperature of as much as up to about 2000° F. for an impregnated ceramic fiber, thereby vaporizing any fugitive solvent or liquid vehicle of a rigidizer or of a binder and leaving the residue in the compressed fiber roll cover.

The roll material is subsequently compressed and formed into the cover roll 16 of the present assembly. This can be done, as noted, by compressing the fibers or fiber discs in a mold or through other means to form a fiber cylinder of the predetermined size and shape.

Thus, in one method, fiber discs are assembled onto a metal or ceramic shaft. The shaft at its far end is equipped with an end plate. When a substantial number of discs have been assembled in a loose pack on the shaft, a moveable compression end plate is moved against the discs, compressing them against the end plate. Pressure can then be brought on the fiber discs by the end plates in any manner convenient for compressing the fiber discs together. For example, threaded rods can connect the end plates and an air wrench can be used to tighten bolts at the end of the rods to gradually bring the end plates closer and closer together. Or hydraulic cylinders can be used to press against end plates. After compression of a section of discs by such procedure, a locking ring can be used to replace the movable end plate and the procedure can be repeated by sliding additional discs onto the shaft with the subsequent reapplication of the movable end plate and then applying pressure. In this way, a roll of desired length can be assembled, and permanent end plates can be placed on the roll after removal from the shaft.

After such a roll has been assembled, the outer surface of the roll may be rough. It can then be worked to provide a hardened, as well as smooth, outer roll fiber surface. For example, the outer surface of the ceramic fiber can be smoothed by burnishing the fiber, usually after machining, or after machining plus grinding. This may be achieved by forcing a highly polished rotatable metal element forcefully against the fiber surface and then moving this burnishing tool back and forth against the fiber roll as the fiber roll is being rotated. Smoothing can not only provide for a highly desirable smooth and uniform surface, but can also serve to improve and harden the fiber cover at its outer surface. This outer surface working can also be utilized to provide indentations in the fiber cover, e.g., so as to provide a textured outer appearance that can serve to offer better gripping of the cover with the product moving across the roll cover. After any outer surface working, including machining or grinding, the fiber cover may then be further conditioned.

Figure 12:
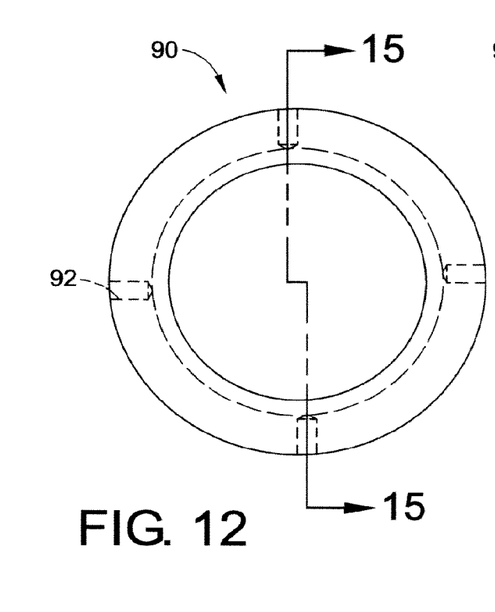
FIG. 12 is a top view of a retaining ring.
Figures 13, 14, 15:
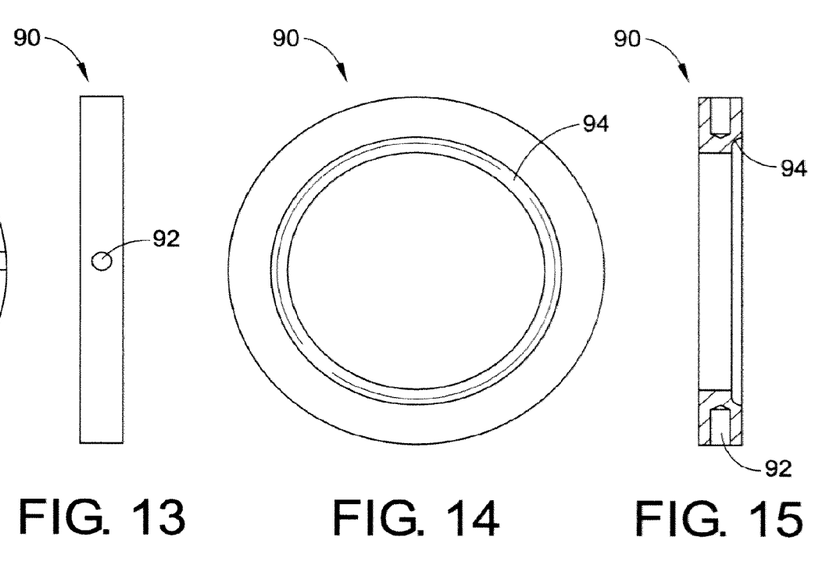
FIG. 13 is a side view of a retaining ring.
FIG. 14 is a top view of a retaining ring.
FIG. 15 is a cross-sectional view of a retaining ring

The fiber cover, will provide a dense, impact resistant and thermally stable surface. The roll can be fitted with a locking collar 22 or retaining ring 90, which allows it to attach to the spool.

In practice then, the changing of the surface of such a roll during maintenance simply entails removing the old insulated roll sleeve from the roll assembly and replacing it with a new insulated roll sleeve.

With regard to conveyor rolls used in galvanizing applications or steel processing, the cover roll may comprise a steel alloy or other material suited to the conditions. Thus, for roll assemblies used in such applications, a roll sleeve may be provided comprising a steel alloy having a composition found in one of U.S. Pat. Nos. 6,004,507; 6,168,757; 6,562,293; and 6,899,772, the disclosures of which are incorporated herein by reference in their entirety. Rolls made from such alloys show good resistance and other properties in such applications.

It should be noted that these examples are exemplary in nature and in no way are meant to be exhaustive or restrictive of the scope of the invention, but are for illustration of the concept of this invention. One skilled in the art will recognize the applicability of the inventive concept to a large number of different embodiments.

The invention has been described with reference to the preferred embodiment. Obviously, modifications and alterations will occur to others upon reading and understanding the preceding, detailed description. It is intended that the invention be construed as including all such modifications and alterations, insofar as they come within the scope of the appended claims or the equivalents thereof.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A conveyor roll assembly for metal or glass processing comprising:
    an inner roll shaft having an elongated cylindrical surface;
    a removable spool comprised of steel and having a cylindrical body including a first diameter, a cylindrical interior passage sized to accomodate said inner roll shaft, and a collar at a first end;
    a removable and replaceable insulated roll sleeve slidably mounted over at least a portion of said spool and abutting said collar, the insulated roll sleeve including at least one layer of an insulation material; and
    a releasable securing means at a second end retaining said spool on said inner roll shaft wherein said insulated roll sleeve is held under compression between said collar and a compression member and said insulated roll sleeve remains under compression when the spool is removed from the inner roll shaft.

2. The conveyor roll of claim 1, wherein the inner roll shaft is comprised of steel.

3. The conveyor roll of claim 1, wherein the inner roll shaft is comprised of ceramic material.

4. The conveyor roll of claim 1, wherein the assembly includes a key and keyway extending at least partially through the inner roll shaft and spool to keep the spool aligned with the roll shaft while in operation.

5. The conveyor roll of claim 1, wherein the spool includes at least one peripheral recess providing a point of attachment for a snap ring.

6. The conveyor roll of claim 1, wherein an outer surface of the inner roll shaft includes a central area of reduced diameter positioned between a first distal portion and a second distal portion, wherein the removable spool is operably located on the inner roll shaft such that the removable spool is in contact with the inner roll shaft at each of the first distal portion and the second distal portion and spaced from the inner roll shaft over the central area.

7. The conveyor roll of claim 6, wherein at least one of the first distal portion and second distal portion includes a chamfer region about a leading edge of the distal portion.

8. The conveyor roll of claim 1, wherein the securing means comprises a threaded circumference on the inner roll shaft and a cooperative locking collar nut.

9. The conveyor roll of claim 1, wherein the collar abuts an end plate secured to an end of the inner roll shaft.

10. The conveyor roll of claim 1, wherein the securing means includes a pressure plate, at least one spring, a locking collar and a snap ring adapted to the inner roll shaft to abut the spool.

11. The conveyor roll of claim 1, wherein said insulated roll sleeve comprises ceramic fiber.

12. The conveyor roll of claim 11, wherein the said ceramic fiber comprises one of silica and aluminum.

13. The conveyor roll of claim 11, wherein said ceramic fibers include different lengths in a mat form.

14. The conveyor roll of claim 1, wherein the length of the roll sleeve is at least 14.25 inches, the first diameter of the removable spool is at least 2.5 inches, the second diameter of the removable spool is at least 3 inches, and a roll body end plate of the inner roll shaft has a diameter of at least 3 inches whereby the removable spool abuts the roll body end section at a first location.

15. The conveyor roll of claim 1, wherein said cylindrical body of the spool includes a length, said length of the cylindrical body being greater than a length of the insulated roll sleeve.

16. The conveyor roll of claim 1, wherein said insulated roll sleeve comprises a monolithic body between said collar and said compression member.

17. The conveyor roll of claim 1, wherein said cylindrical body of the spool includes a contiguous support surface for said roll sleeve between said collar at the first end and the second end adjacent the releasable securing means.

* * * * *

UNITED STATES PATENT AND TRADEMARK OFFICE
CERTIFICATE OF CORRECTION

| | | |
|---|---|---|
| PATENT NO. | : 8,915,830 B2 | Page 1 of 1 |
| APPLICATION NO. | : 13/259287 | |
| DATED | : December 23, 2014 | |
| INVENTOR(S) | : March et al. | |

It is certified that error appears in the above-identified patent and that said Letters Patent is hereby corrected as shown below:

In the Claims

Column 10, line 25, claim 12, replace "aluminum" with "alumina"

Signed and Sealed this
Seventh Day of April, 2015

Michelle K. Lee
*Director of the United States Patent and Trademark Office*